Figure 1:
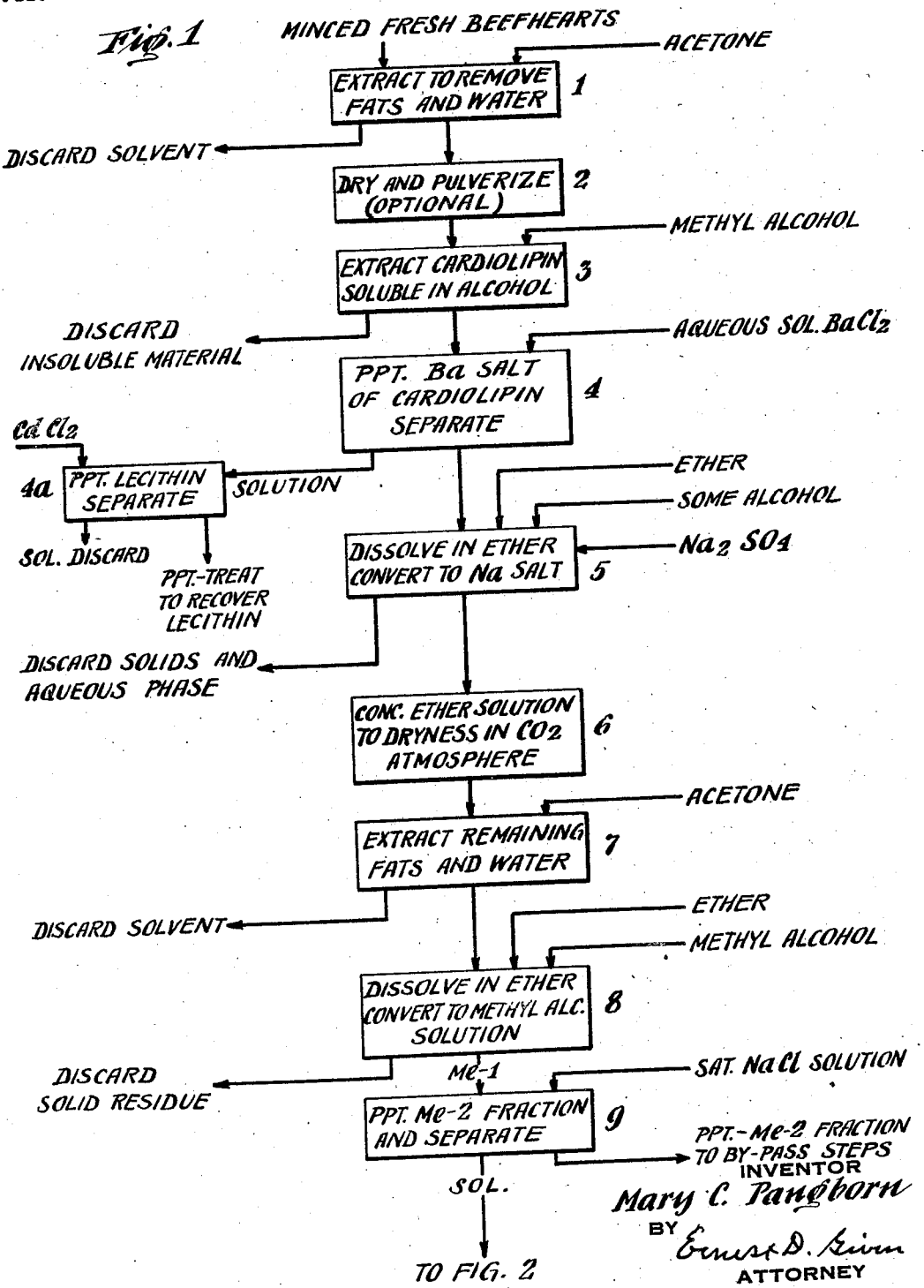

Dec. 21, 1948. M. C. PANGBORN 2,456,836
METHOD OF RECOVERING AND REFINING CARDIOLIPIN
Filed March 30, 1946 3 Sheets—Sheet 1

INVENTOR
Mary C. Pangborn
BY Ernest D. Ginn
ATTORNEY

Dec. 21, 1948.     M. C. PANGBORN     2,456,836
METHOD OF RECOVERING AND REFINING CARDIOLIPIN
Filed March 30, 1946
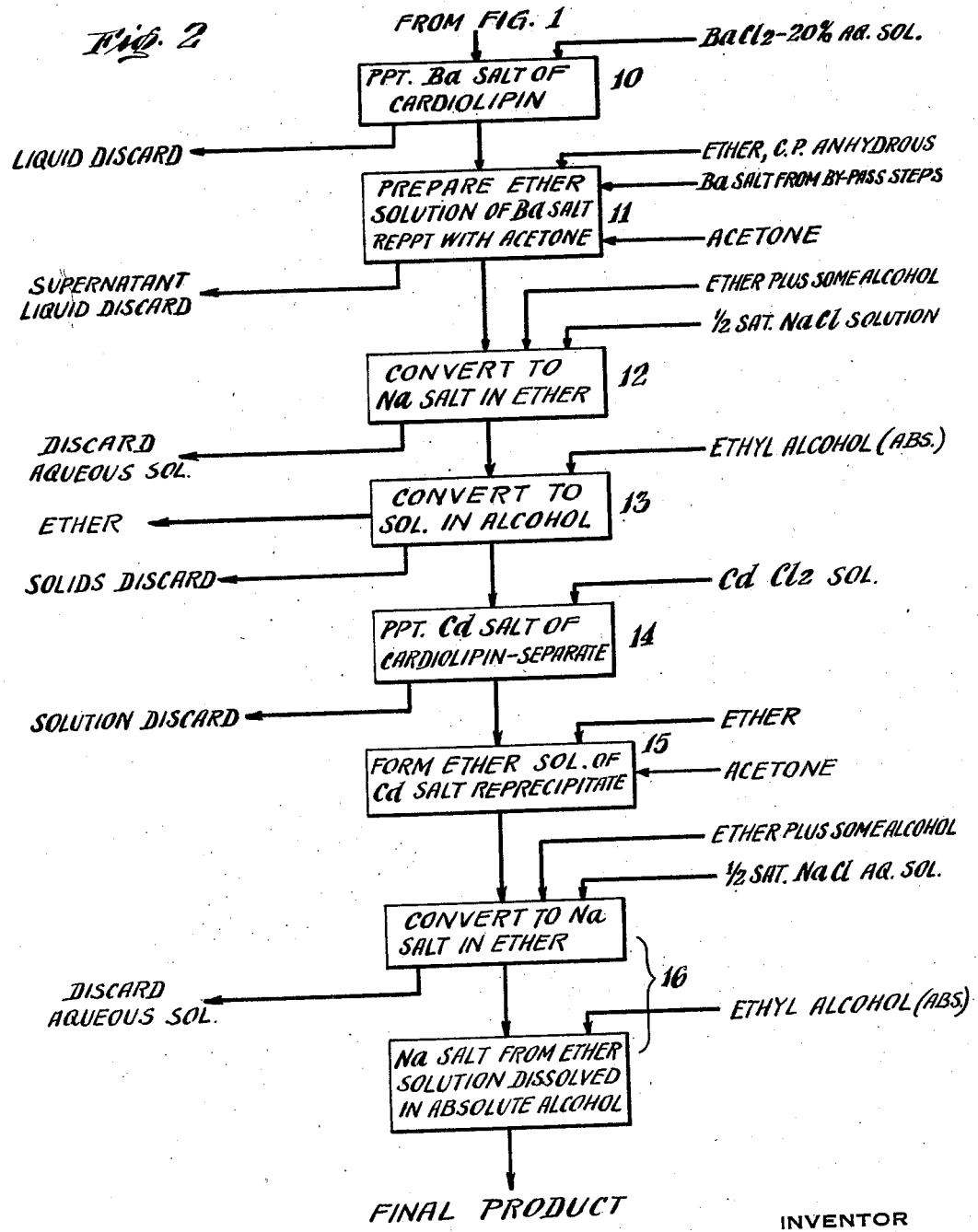
INVENTOR
Mary C. Pangborn
BY
Ernest D. Given
ATTORNEY Dec. 21, 1948.    M. C. PANGBORN    2,456,836
METHOD OF RECOVERING AND REFINING CARDIOLIPIN
Filed March 30, 1946    3 Sheets-Sheet 3
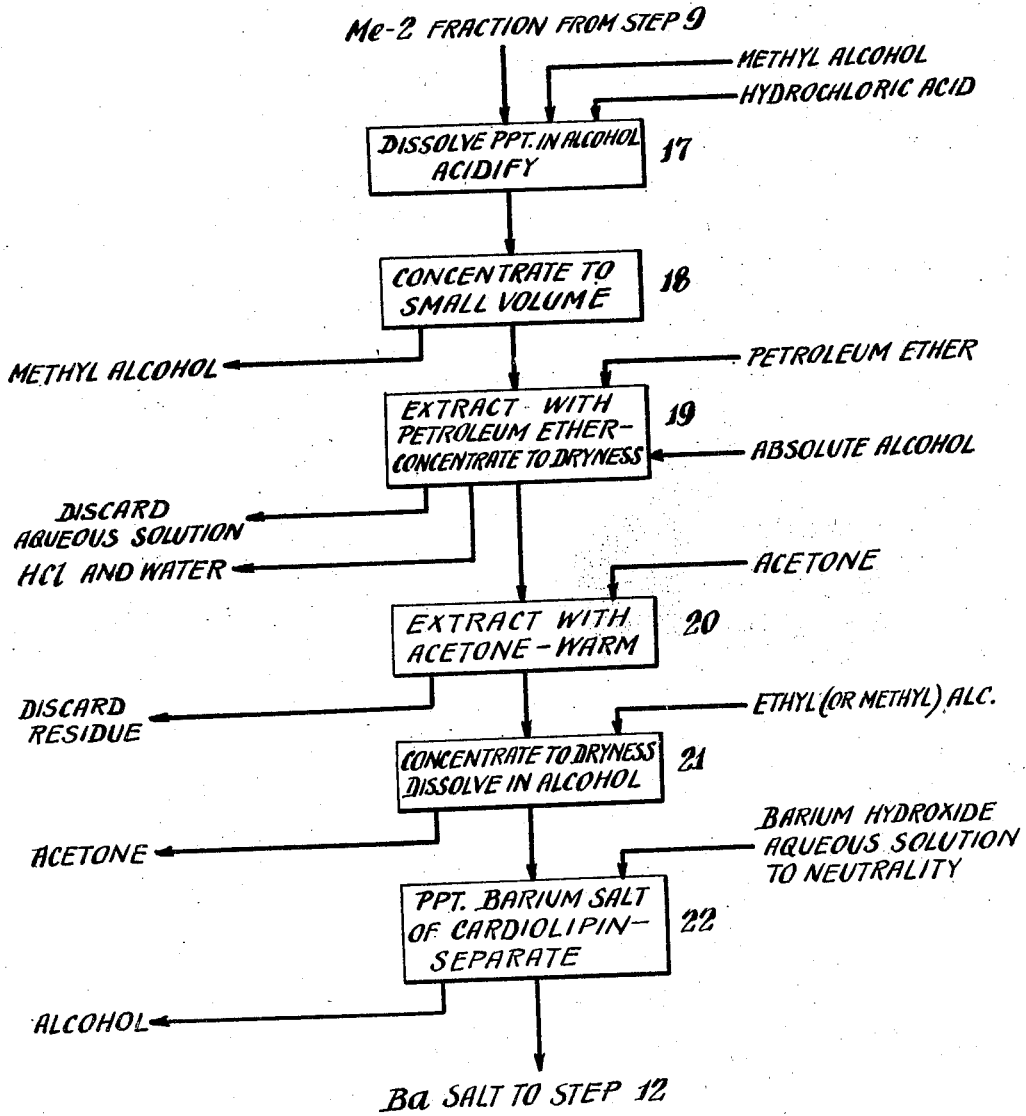

Patented Dec. 21, 1948

2,456,836

UNITED STATES PATENT OFFICE 2,456,836

METHOD OF RECOVERING AND REFINING CARDIOLIPIN

Mary C. Pangborn, Albany, N. Y., assignor to the People of the State of New York Application March 30, 1946, Serial No. 658,567

2 Claims. (Cl. 167—74)

The present invention relates to a method of recovering and refining cardiolipin, a phospholipid found in certain animal tissue, especially beef hearts. Some time ago, it was discovered that certain alcoholic extracts of beef hearts had qualities comparable to that of antigens in that they could be used in certain serological tests for syphilis. For some time it was not known what material or materials in or characterictics of the beef heart extract was effective in this respect. Further work, however, was done by the present applicant, which has shown that a previously unknown phospholipid, which has been isolated from beef heart and purified, is effective in this use in conjunction with purified lecithin and cholesterol. This new phospholipid has been given the name "cardiolipin." Several articles have been published by the present applicant, describing the use and certain prior methods of purifying this material, these articles being published in the following publications: 137 J. Biol. Chem. 545 (1941); 48 Proc. Soc. Exp. Biol. & Med. 484 (1941); 143 J. Biol. Chem. 247 (1942); 153 J. Biol. Chem. 343 (1944); and 157 J. Biol. Chem. 691 (1945). All of these articles, however, while disclosing certain data as to the usefulness of this material and some few of the steps of the present method for the purification thereof, did not disclose the present improved process or method of purifying this material, which is set forth hereinafter and which results in the production of a highly purified form of cardiolipin, with a yield substantially greater for a given amount of original material used than any of the prior teachings. A primary object of the present invention, therefore, is to provide such a process of recovering and refining cardiolipin as will result in a highly purified material of maximum utility in making the tests aforesaid and wherein the yield is a maximum that can be obtained by any presently known process and with a minimum of difficulty in the practice of the process itself.

Basically the process is one in which beef heart muscle is extracted with a suitable solvent and the cardiolipin contained in the extract material is separated by repeated precipitation with inorganic salts and purified by the use of organic solvents.

Cardiolipin is known to occur in other animal tissues than beef hearts such, for example, as liver. As such, the present method is not limited in its application to beef hearts, but may be applied to any animal tissue containing sufficient amounts of cardiolipin to warrant the expense and trouble of obtaining it therefrom. In some instances, certain phases of the process may require some variation in treating other materials than beef hearts, although the present process is completely operative on such other types of raw material with the reservation that the efficiency thereof may be somewhat less using such other raw or starting materials than using beef hearts.

To assist the reader in following the process, there is submitted herewith in the accompanying drawings a flow sheet showing the sequence of steps in the process and showing a by-pass portion for recovering a relatively small portion of cardiolipin, which would otherwise be lost and which may be recovered and returned to the process by using a special procedure effective on this portion.

In the drawings:

Figs. 1 and 2 combined, when placed together with Fig. 2 below and in juxtaposition to Fig. 1, illustrate a complete flow sheet of a preferred process in accordance with the present invention; and Fig. 3 is a similar view of a flow sheet of a by-pass portion of the process.

According to my present invention, fresh beef hearts are mechanically freed from fat and connective tissue as far as is feasible, then minced or comminuted to a desired extent. This comminuted tissue is then extracted, preferably at least twice, with a water-miscible organic solvent in which cardiolipin is insoluble, for example, acetone, the acetone being used in the proportion of about 1.2 ml. of such solvent per gram of minced tissue. The solvent and any material dissolved therein are then removed as by filtration. This is step 1 of the accompanying flow sheet.

The tissue may then be substantially dried and pulverized as step 2. However, if the tissue was finely comminuted in the wet state, as by an efficient homogenizer, it is not necessary to pulverize and the procedure is thereby simplified. Drying to remove acetone is then optional; an alternative procedure is to wash the tissue on the filter with a small amount of alcohol (ethyl or methyl).

The dried pulverized tissue is then extracted, preferably at least twice, with a lower aliphatic alcohol, preferably 95% methyl alcohol (or ethyl alcohol), preferably in the proportion of about 2 liters of solvent to 300 grams of substantially dried tissue or 2 liters per kilogram of original wet weight. In the preferred process according to the invention, as illustrated by step 3, each such extraction is carried out at about room temperature for a period of about 5 to 7 days.

I also contemplate that dried beef heart powder, such as is now available on the market for the preparation of crude antigens, might be substituted for fresh beef hearts, although probably with a lower efficiency. In this extraction it is preferred to use methyl alcohol as it has been found to be a more efficient solvent for cardiolipin than ethyl alcohol.

Following the extraction with alcohol, the alcohol-insoluble material is discarded, as cardiolipin in the form in which it occurs in the animal tissue, which is probably as the sodium or potassium salt, is reasonably soluble in the lower aliphatic alcohols.

The next step in the process, numbered 4 on the accompanying drawings, is the precipitation of an alkaline earth salt of cardiolipin, preferably by adding a concentrated aqueous solution of an alkaline earth halide such as barium chloride. This treatment is continued until no further precipitate forms. The precipitate is collected, preferably by centrifugation, after the mixture has been allowed to stand for about 24 hours at a temperature of about 3°-6° C. The solid material resulting from this separation and which includes the relatively impure barium salt of cardiolipin is then carried to the next step, numbered 5 on the drawings.

According to some processes for purifying cardiolipin, this precipitation may be done by cadmium chloride; but in such event the following steps must be varied somewhat as cadmium chloride also precipitates lecithin, which is also present in the original material. Calcium chloride may, however, be used as an alternative to the barium chloride, which is the preferred material for use in this process.

Following this step of the process, the supernatant liquid is separated from the precipitate and may be treated for the recovery of the lecithin, which may be selectively precipitated therefrom by the use of cadmium chloride and then purified in a manner which forms no part of the present invention, but which may be a useful adjunct thereto, as the lecithin so prepared is from certain points of view more desirable for use in conjunction with the cardiolipin in certain serological tests than lecithin prepared from other sources. This step of the precipitation of the lecithin is shown on the accompanying drawings at 4a.

This barium salt of cardiolipin is soluble in ether, particularly in wet ether. The next step, numbered 5, is for the purpose of the conversion of the alcohol-insoluble barium salt into an alcohol-soluble salt, which is preferably an alkali metal salt of cardiolipin, such as those of sodium or potassium. I have found that this change from the insoluble alkaline earth salt to the soluble alkali metal salt may be effected in the presence of a small amount of methyl or ethyl alcohol by adding to the ether solution of the barium salt a 5% aqueous solution of an alkali metal salt such as sodium sulphate. Subsequent to this addition the mixture is shaken vigorously, so as to permit the chemical interchange to take place. This results in the precipitation of barium sulphate, which collects in the aqueous phase of the system. In order that this interchange may take place successfully, I have found that some ethyl or methyl alcohol should be present, which alcohols are miscible with either the water phase or the ether phase of the system present.

In particularly carrying out step 5 of the process, the precipitate from the previous step 4 which is wet with methyl alcohol, is treated with about four times its volume of ether and about 50 ml. of 5% aqueous solution of $Na_2SO_4$ for each 100 ml. ether. The insoluble material, consisting primarily of barium sulphate together with some organic impurities, may then be removed by decantation or preferably by centrifugation. This insoluble material and the aqueous layer are separated and discarded. The ethereal solution, containing the sodium salt of cardiolipin, may then be dried on anhydrous sodium sulphate.

The next step of the process, numbered 6 on the accompanying drawings, is to concentrate the dried ethereal solution substantially to dryness to eliminate the ether therefrom. Due to the fact that the sodium-salt of cardiolipin is sensitive to deterioration by contact with the oxygen of air and possibly also by light when not in an alcohol solution, the final stage of this evaporation is done in vacuo in the presence of an inert gas, such as carbon dioxide, and under non-oxidizing conditions, carbon dioxide being used to displace air during all vacuum distillations in the process throughout, so as to protect the material against damage by oxidation.

The next step, numbered 7 on the accompanying flow sheet, may be considered optional, but is usually desirable at this point in the process. The object is to remove any remaining water and fats, which is done as in the first step hereinabove set forth by extracting the material resulting from step 6 by the use of a solvent in which the sodium salt of cardiolipin is insoluble. Such a solvent is, for example, acetone. Particularly this step is done by extracting with several portions of the solvent, preferably warmed to not more than about 50° C. and discarding the solvent and extract.

The next step of the process, numbered 8, is to dissolve the resulting substantially solid material in ether and then convert it to an alcohol solution by adding about 10 volumes (in respect to the ether solution) of a lower aliphatic alcohol, with rapid mixing. In this case, it is preferred to use C. P. absolute methyl alcohol. Any methyl alcohol-insoluble material is discarded at this point, after it has been thoroughly washed with warm methyl alcohol. The combined solutions in methyl alcohol are then preferably concentrated in vacuo in order to remove ether and reduce the volume to a convenient amount. This operation yields a methyl alcohol solution containing cardiolipin in the form of its sodium salt. This solution I have designated as fraction Me-1.

To this fraction, as shown in step 9 of the process, is then added about 2 per cent of its volume of a saturated aqueous solution of sodium chloride and the mixture refrigerated at about 3°-6° C. overnight. This results in two fractions: (a) the supernatant liquid, and (b) a precipitate which I choose to designate as fraction Me-2, the treatment of which will be hereinafter considered as a by-pass portion of the process. Both these fractions contain cardiolipin, but the supernatant liquid contains much more proportionately than fraction Me-2. The supernatant liquid is then separated from the precipitate in any suitable manner, preferably by simple decantation.

As step 10 of the process, the cardiolipin in this liquid is precipitated therefrom by adding an aqueous solution of an alkaline earth halide, preferably about a 20% solution of barium chloride, this solution being added until no further precipitate forms. The mixture is then chilled in ice, with frequent shaking to aid flocculation.

This alkaline earth metal salt of cardiolipin, such as the barium precipitate, is then collected by centrifugation, washed with methyl alcohol and preferably also with acetone.

As shown in step 11, this precipitate is dissolved in ether, C. P. anhydrous, and reprecipitated from the ethereal solution by adding at least an equal volume of acetone. Acetone used in this and subsequent steps should be of C. P. grade. During this reprecipitation process substances other than cardiolipin are removed in the etheracetone supernatant liquid. It is this step of the process to which the barium salt of cardiolipin resulting from the by-pass series of steps for the purification of the Me-2 fraction is returned as hereinafter set forth.

The barium salt of cardiolipin forms gelatinous solutions in anhydrous ether, with a characteristic appearance which is helpful in judging the success of the purification. This reprecipitation by dissolving in ether and reprecipitating by adding acetone may be repeated the desired number of times until the supernatant liquid is nearly colorless. As a final step, the reprecipitation may be effected by dissolving in wet ether or ether to which a little water is added. In wet ether a clear solution rather than a gel is obtained. The final precipitate obtained from this solution, by adding about two volumes of acetone, is the nearly pure barium salt of cardiolipin.

The combined barium salts of cardiolipin prepared as above set forth are then converted to soluble alkali metal salts by dissolving the Ba salt in wet ether containing about 10% by volume of a lower aliphatic alcohol, such as ethyl or methyl, and the solution shaken vigorously for about five minutes with about one-third its volume of a one-half saturated aqueous solution of sodium chloride or some other alkali metal soluble salt, preferably a halide. This effects the conversion of the barium salt of cardiolipin to the corresponding sodium or alkali metal salt thereof, as indicated on the accompanying flow sheet at step 12. The aqueous layer is then drawn off and the process repeated at least twice again with fresh portions of the aqueous solution of sodium chloride, each time alcohol being added in the proportion of about ten per cent of the ethereal solution present. I have found that the reaction does not go to substantial completion unless alcohol is present. The resulting sodium salt of cardiolipin in the ethereal solution may then be treated to remove most of the added alcohol by washing it with further portions of one-half saturated aqueous solution of sodium chloride and then drying it on anhydrous sodium sulphate. The ethereal solution is then filtered from the sodium sulphate concentrated by distillation and then poured into about ten volumes of absolute ethyl alcohol. This alcoholic solution may then be concentrated in vacuo to remove ether and clarified by centrifugation, solids being discarded. There results a solution in alcohol of the sodium salt of cardiolipin. It has been found that the solubility of this sodium salt which is now approximately pure, is about 10 mg./ml. The volume of the solvent used should be so chosen in view of this solubility that all the cardiolipin present will be in solution. This conversion to an alcohol solution of the sodium salt is shown in the accompanying flow sheet as step 13.

Final purification of the cardiolipin may be effected as shown in steps 14 to 16, by precipitating the cadmium salt of cardiolipin, for example by adding an aqueous solution of $CdCl_2$ until no further precipitate forms. It is advantageous to use a concentrated solution of $CdCl_2$, for example, 50% by weight, since only a small volume of such a solution is required and the final mixture is therefore not substantially diluted with water. The mixture is then refrigerated to facilitate flocculation and leave a clear supernatant. The precipitate so formed may be collected by centrifugation and washed once with absolute ethyl alcohol. This is shown as step 14.

This alcohol-wet precipitate is then mixed with an equal volume of ether which amounts to washing the Cd salt with a 1:1 mixture of alcohol and ether. An excess of ether is to be avoided as it will tend to dissolve the Cd salt, which will then be lost in the supernatant. The mixture is centrifuged, the supernatant discarded, and to the precipitate is added sufficient C. P. anhydrous ether to form a fairly stiff, substantially transparent gel, to which is then gradually added about an equal volume of acetone. This effects the reprecipitation of the cadmium salt of cardiolipin and may be repeated one or more times, this being step 15.

This purified cadmium salt should be substantially clear and colorless in solution in a small volume of wet ether and be finally reprecipitated therefrom by the use of about 2 to 3 volumes of acetone.

The final step, numbered 16, is the conversion of the cadmium salt to the sodium salt which is effected substantially as described for steps 12 and 13 hereinabove, in which the barium salt is converted to the sodium salt. There results a sodium salt of cardiolipin dissolved in absolute ethyl alcohol, which is the final product. This product may then be used in a manner forming no part of the present invention in preparing antigens. The concentration of cardiolipin in this solution may be quite accurately determined by performing a microgravimetric analysis for phosphorus, the sodium salt of cardiolipin containing about 4.18 per cent phosphorus, so that the concentration may then be calculated, using this figure.

A satisfactory preparation of the sodium salt of cardiolipin should have the following properties:

Solubility—readily soluble in petroleum ether, ether or chloroform; moderately soluble in absolute ethyl alcohol; emulsifiable in water. Concentrated solutions should appear substantially colorless. The absolute ethanol stock solution is usually cloudy when first prepared, but on standing at 3°–6° C. the trace of insoluble matter tends to settle out to leave a clear stable solution which may be decanted.

Analysis: Iodine number: 115 or higher.
Nitrogen: not greater than 0.05 per cent, and probably zero in the absolutely pure product.

Returning now to the by-pass procedure, which is used for recovering relatively small amounts of cardiolipin found in the Me-2 fraction from step 9, as shown on the drawings, and particularly referring to Fig. 3, this precipitate resulting from this step and which contains the relatively impure sodium salt of cardiolipin is first redissolved in methyl alcohol and the solution acidified with an aqueous solution of a mineral acid such as hydrochloric acid, this step being designated 17.

The resulting material is then concentrated to small volume in vacuo to remove most of the methyl alcohol and to leave an aqueous suspension of the desired material plus some impurities, this being step 18 on the drawing.

The remaining material is then extracted with petroleum ether and the aqueous solution remaining after this extraction discarded. The petroleum ether solution is then concentrated substantially to dryness to remove water and excess acid as hydrochloric acid, the cardiolipin at this time being in the form of the free acid, this step being shown at 19 in the drawing. The residue is preferably freed from water by adding a small portion of absolute alcohol and again evaporating substantially to dryness in vacuo.

The residue from this concentration step is then extracted with acetone in which the acid form of cardiolipin is soluble, any insoluble residue being discarded to eliminate further impurities, this being step 20. In this step, the acetone is used preferably in the proportion of about 10 ml. per gram of the solid material to be extracted thereby. The mixture is warmed to about 50° C. and vigorous shaking used. The dissolved material is then chilled in ice to eliminate substances insoluble in acetone at the lower temperature. The extraction may be repeated with several fresh portions of acetone, so as to recover a maximum yield of the cardiolipin.

The acetone solution is then concentrated nearly to dryness so as to remove excess acetone and reduce the volume to be handled to a desired amount; then the resulting concentrate is diluted with 95% alcohol which is preferably ethyl alcohol, but may also be methyl alcohol, this being step 21 shown in the drawing.

The final step 22 of this by-pass procedure is the preparation of the alcohol-insoluble barium salt of cardiolipin, which is effected by neutralizing the alcohol solution with an aqueous solution of barium hydroxide. In this connection, other alkaline earth metal hydroxides may be alternatively employed to obtain the corresponding alkaline earth salts of cardiolipin. The precipitate thus formed is separated from the supernatant liquid and added to the corresponding material entering step 11 as aforesaid. Since acid cardiolipin is unstable, the entire by-pass procedure, from the addition of mineral acid through and including neutralization with $Ba(OH)_2$, must be completed within a single day.

While there is not specifically disclosed herein any provision for solvent recovery, it is contemplated that suitable provisions to this end might well be made in any commercial operations on a substantial scale and based upon solely economic factors.

While there is described herein a preferred process in accordance with the present invention, and certain variants of different steps thereof are suggested or specifically taught, I do not wish to be limited except by the scope of the appended claims, which are to be construed validly as broadly as the state of the prior art permits.

What is claimed is:

1. The process of recovering and refining cardiolipin, which comprises the steps of removing fat and water from comminuted beef hearts containing cardiolipin by extracting such material with acetone and discarding the extracted material, extracting cardiolipin from the remaining solid material with methyl alcohol and discarding the solid residue, precipitating the cardiolipin from the alcohol extract solution as an insoluble salt by treating such solution with an aqueous solution of barium chloride and separating and discarding the admixed liquid, converting the precipitate thus formed to an alcohol-soluble sodium salt of cardiolipin in the presence of alcohol by dissolving it in ether and adding an aqueous solution of sodium sulphate, separating and discarding the resultant barium sulphate and the aqueous liquid, concentrating the liquid ether phase substantially to dryness in an atmosphere of carbon dioxide, removing remaining fats and water by extracting the resulting material with acetone in which the sodium salt of cardiolipin is substantially insoluble and discarding the acetone extract, dissolving the acetone-insoluble residue in ether and converting it to a solution in methyl alcohol by adding a predetermined volume of methyl alcohol and removing the ether by vacuum distillation, adding a concentrated aqueous solution of sodium chloride and maintaining the resultant materials at a temperature above but approaching the freezing point for a predetermined time to precipitate a portion thereof, separating this precipitated portion from the remaining liquid, precipitating from the remaining liquid an alcohol- and water-insoluble barium salt of cardiolipin by adding an aqueous solution of barium chloride and separating the resulting precipitate from the liquid, dissolving this precipitate in anhydrous ether and reprecipitating the same salt therefrom by adding a substantal excess of acetone in which the barium salt of cardiolipin is insoluble, separating and discarding the liquid from this precipitate, reprecipitating the barium salt of cardiolipin a plurality of times by dissolving in ether and precipitating it therefrom by adding an excess of acetone, converting this reprecipitated barium salt of cardiolipin into a sodium salt thereof by dissolving the barium salt in ether, adding ethyl alcohol and an aqueous solution of sodium chloride and substantially removing the ether by distillation and preparing an alcohol solution of the sodium salt of cardiolipin, precipitating the cadmium salt of cardiolipin from this alcohol solution by adding an aqueous solution of cadmium chloride thereto and separating the resultant precipitate of the alcohol-insoluble cadmium salt of cardiolipin from the liquid, dissolving this precipitate in ether and reprecipitating it therefrom by adding a substantial amount of acetone in which the cadmium salt of cardiolipin is insoluble and separating and discarding the liquid, and dissolving the resultant purified cadmium salt in ether and converting it to the form of an alcohol-soluble sodium salt of cardiolipin in the presence of ethyl alcohol by adding such alcohol and an aqueous solution of sodium chloride, and preparing an alcohol solution of the sodium salt of cardiolipin as the final product.

2. The process of recovering and refining cardiolipin, which comprises the steps of removing fat and water from comminuted fresh beef hearts by treating such material with acetone in proportion of about 1.2 ml. per gram of solid material, removing the acetone by filtration and discarding the solution, drying the remaining solid material and extracting it with 95% methyl alcohol in the proportion of about 2 liters per 300 grams dried tissue and discarding the solid residue, precipitating cardiolipin from the solution by adding a 20% aqueous barium chloride solution thereto and refrigerating for about 24 hours at about 3° to 6° C., separating and discarding the admixed liquid, converting the precipitate thus formed to a sodium salt of cardiolipin by dissolving it in ether and shaking with about half the volume of a 5% aqueous sodium sulphate solution in the presence of methyl alcohol, separating and discarding the solid material and the aqueous layer from the ether solution of the sodium salt of cardiolipin, drying the ether solution with anhydrous sodium sulphate, concentrating the ether solution substantially to dryness under non-oxidizing conditions and in the presence of $CO_2$, extracting the dried material with acetone and discarding the solution to remove remaining fats and water, dissolving this residue in ether and converting it to a solution in methyl alcohol by adding about 10 volumes of the latter and thereafter distilling in vacuo to remove the ether, adding about 2% by volume of a saturated aqueous solution of sodium chloride and refrigerating at about 3°–6° C. for about 12 to 24 hours to give a liquid fraction and a solid fraction, both containing cardiolipin, separating these fractions and treating the liquid fraction by precipitating the barium salt of cardiolipin therefrom by adding thereto a 20% aqueous solution of barium chloride, separating the precipitate thus formed from and discarding the liquid and then dissolving the precipitate in anhydrous ether, reprecipitating the barium salt of cardiolipin therefrom by adding at least an equal volume of acetone, repeatedly reprecipitating the barium salt of cardiolipin by dissolving it in ether and reprecipitating it therefrom with acetone until the supernatant liquid is nearly colorless, dissolving the barium salt of cardiolipin in wet ether containing about 10% by volume ethyl alcohol and adding thereto about one-third the total, volume of a half saturated aqueous solution of sodium chloride to convert the barium salt of cardiolipin into the corresponding sodium salt thereof, drying the ether solution on sodium sulphate, removing the ether by distillation, adding ethyl alcohol to dissolve the cardiolipin salt and precipitating the cadmium salt of cardiolipin from this alcohol solution by adding thereto a concentrated aqueous solution of cadmium chloride, separating the liquid from this precipitate, dissolving this precipitate in ether and reprecipitating therefrom by adding an equal volume of acetone and repeating this procedure a second time, dissolving this precipitate in wet ether and converting it to the sodium salt of cardiolipin in the presence of ethyl alcohol by adding such alcohol and an aqueous solution of sodium chloride and preparing an alcohol solution of the sodium salt of cardiolipin as the final product; and recovering cardiolipin from the solid fraction aforesaid obtained by adding 2% by volume of NaCl to the methyl alcohol solution and combining it thereafter in the process aforesaid by redissolving this solid fraction in methyl alcohol and acidifying it with about 10% of its volume of dilute hydrochloric acid, concentrating the resultant material, including the acid form of cardiolipin in vacuo to remove most of the methyl alcohol, extracting the remaining material with petroleum ether and discarding the aqueous solution, concentrating the petroleum ether solution substantially to dryness in vacuo to remove water and hydrochloric acid, dissolving the acid form of cardiolipin present in acetone and discarding the acetone-insoluble residue, concentrating this acetone solution substantially to dryness in vacuo and dissolving the cardiolipin therefrom with 95% ethyl alcohol, and precipitating the barium salt of cardiolipin therefrom by neutralizing with an aqueous solution of barium hydroxide, and adding this precipitated barium salt to the barium salt aforesaid so as to save this portion of the cardiolipin to the process.

MARY C. PANGBORN.

REFERENCES CITED

The following references are of record in the file of this patent:

Pangborn in J. of Biological Chemistry, vol. 143 (1942), pages 247–255; vol. 153 (1944), pages 343–348, and vol. 157 (Feb. 1945), pages 691, 692.